United States Patent
Dimillo (10) Patent No.: US 10,316,239 B2
(45) Date of Patent: Jun. 11, 2019

(54) COMPRESSIBLE GROUT MIX FOR USE IN ABSORBING COMPRESSIVE OR DEFORMATION STRESSES OF SUBTERRANEAN FORMATIONS

(71) Applicant: Tony Dimillo, Newmarket (CA)

(72) Inventor: Tony Dimillo, Newmarket (CA)

(*) Notice: Subject to any disclaimer, the term of this patent is extended or adjusted under 35 U.S.C. 154(b) by 0 days.

(21) Appl. No.: 15/672,227

(22) Filed: Aug. 8, 2017

(65) Prior Publication Data
US 2018/0037801 A1    Feb. 8, 2018

Related U.S. Application Data

(63) Continuation-in-part of application No. 15/193,843, filed on Jun. 27, 2016.

(51) Int. Cl.
| | | |
|---|---|---|
| E21D 11/05 | (2006.01) |
| C09K 8/473 | (2006.01) |
| C04B 28/04 | (2006.01) |
| C04B 14/10 | (2006.01) |
| C04B 16/08 | (2006.01) |
| C04B 24/04 | (2006.01) |
| E21D 11/10 | (2006.01) |
| E21D 11/38 | (2006.01) |
| E21F 15/00 | (2006.01) |

(Continued)

(52) U.S. Cl.
CPC ............ *C09K 8/473* (2013.01); *C04B 14/104* (2013.01); *C04B 16/08* (2013.01); *C04B 24/04* (2013.01); *C04B 28/04* (2013.01); *E21D 11/105* (2013.01); *E21D 11/38* (2013.01); *E21F 15/00* (2013.01); *C04B 2103/22* (2013.01); *C04B 2103/302* (2013.01); *C04B 2111/00724* (2013.01); *C04B 2111/70* (2013.01)

(58) Field of Classification Search
CPC combination set(s) only.
See application file for complete search history.

(56) References Cited

U.S. PATENT DOCUMENTS

| | | | |
|---|---|---|---|
| 5,512,096 A | * | 4/1996 | Krause .................. C04B 28/001 106/718 |
| 2014/0221534 A1 | * | 8/2014 | Osborne, Jr. ........... C04B 28/04 524/3 |

(Continued)

*Primary Examiner* — Kyle Armstrong (57) ABSTRACT

The present invention provides for a compressible grout mix for filling an annular gap between a tunnel rock wall surface and a tunnel liner of a tunnel in a rock formation subject to time dependent deformation after excavation and a method of filling the annular gap between a tunnel rock wall surface and a tunnel liner of a tunnel in a rock formation subject to time dependent deformation after excavation utilizing the compressible grout mix for resilient absorption of forces in the hardened state of the compressible grout mix exerted by the time dependent deformation of the rock wall surface into the tunnel opening. The method includes:

a. providing the compressible grout mix comprising hydraulic binding agent, bentonite clay, polymer foam particles, water-reducing admixture, water and air, b. placing the compressible grout mix in the annular gap between the tunnel wall rock surface and the tunnel liner, and c. allowing the compressible grout mix to set, wherein the compressible grout mix in the hardened state has a compressible ratio greater than the anticipated time dependent deformation.

9 Claims, 3 Drawing Sheets

Placing compressible grout through the grout socket (51) Int. Cl.
*C04B 103/30* (2006.01)
*C04B 103/22* (2006.01)
*C04B 111/70* (2006.01)
*C04B 111/00* (2006.01)

(56) References Cited

U.S. PATENT DOCUMENTS

2015/0027346 A1* 1/2015 Osborne, Jr. ........... C04B 28/02
  106/708
2015/0284563 A1* 10/2015 Beck .................. C08G 59/5026
  523/401
2016/0340254 A1* 11/2016 Edgar ..................... C04B 28/32
2017/0369374 A1* 12/2017 Dimillo .................. C04B 28/04

* cited by examiner

Figure 1- Placing compressible grout through the grout socket

Figure 2- Grout Stiffness and tensile strength (Design requirement)

Figure 3- Post and pre-test pictures of compressible grout (28 day confined compression test)

Figure 4- Stress/strain plot of sample failure test at 28 days cure

COMPRESSIBLE GROUT MIX FOR USE IN ABSORBING COMPRESSIVE OR DEFORMATION STRESSES OF SUBTERRANEAN FORMATIONS

FIELD OF THE INVENTION

The present invention relates to a compressible grout mix for use as a fill in applications requiring absorption of compressive or deformation stresses between subterranean formations and subterranean structures as well as a method of filling a gap between subterranean formations and subterranean structures in a subterranean formation subject to compressive or deformation stresses. In one particular application, the subterranean formation is a time dependent deformation rock formation and the subterranean structure is a tunnel liner of a tunnel.

BACKGROUND OF THE INVENTION

In subterranean formations which are regular geotechnical non-seismic formations, either soft ground or hard, there is little or no risk of compressive or deformation stresses between the subterranean formation and any subterranean structure in the subterranean formation and thus little or no risk of potential damage of the subterranean structure. However, there are many situations where subterranean structures are placed under compressive or deformation stresses. One example is where a structure is located in a seismic zone subject to earthquakes. In those situations, the compressive and deformation stresses from an earthquake are transferred through the subterranean formation and can cause cracking and damage to subterranean structures such as foundations of buildings, underground tunnels or utility service mains or piping.

Another situation is if the subterranean structures are located in time dependent rock formations (swelling rock), where the deformations can be significant and forces from the rock could damage the subterranean structure over a period of time. This is particularly true in the case of bored tunnels.

Bored tunnels using a Tunnel Boring Machine (TBM) are typically lined with a permanent concrete lining material. Concrete liners can be either cast in place or can be precast segments joined together with the gaps between the segments being filled with a compressible gasket. The selection of the lining material is generally based on the tunnel function and the nature of the rock or soil through which the tunnel is bored.

In time dependent rock formations (swelling rock), the deformations are significant and forces from the rock could damage the concrete liner over a period of time. In such cases, there is a time dependent deformation (TDD) of the rock that can, if not accommodated by the tunnel lining, result in a reduction of the tunnel diameter and potential damage to the tunnel liner. TDD is movement that occurs after the initial ground disturbance that results from tunneling. There are two distinct mechanisms that result in TDD, swelling and squeezing, although they may occur simultaneously and one may lead to the other. Swelling is the time dependent volume increase of the ground and squeezing is the time dependent shearing of the ground. Both phenomena lead to inward movement of the tunnel perimeter. TDD generally occurs over a period of about 3 months to a few years after which time the pressures and forces are balanced and thus relieved.

In the past, in such time dependent deformation rock formations, typically the tunnel liners were cast in place liners constructed after 3 months. In such situations, a temporary liner would be installed. This could result in significantly increased costs of the tunnel construction as a result of the delay in installation of the final liner.

It has been proposed in such situations to use precast tunnel liner segments where the tunnel is bored to a larger diameter than the finished diameter and to utilize a compressible mortar in the gap between the tunnel liner and the tunnel wall. One such compressible mortar is described in EP Patent No. 1,790,624 issued Nov. 28, 2006, to Hochtief Construction AG. This is also described by B. Billig et. al., Deco Grout—Innovative Grout to cope with rock deformations in TBM tunneling, in Underground Space—the $4^{th}$ Dimension of Metropolises, Bartak et. al., eds. (2007), pages 1487-1492. As described in these references, the grout utilizes expanded polystyrene beads along with foam to achieve a grout being capable of being compressed to about 50% of its initial volume. In the studies, they tested expanded clays but rejected them as not being suitable. Also, they developed the grout independent of the actual forces or pressures as they state that these can only be calculated in advance with great difficulty and thus they attempted to develop a grout with a wide envelop of compressibility.

There are unique situations where, in addition to the TDD of the rock, if there are fluids present in the rock, the fluids may be released as water or mud, depending on the rock structure. In these situations, the presence of the fluid may impact the curing of the compressible mortar used as a fill and the compressible mortar may either be washed out or any compressible material in the mortar may float to the surface and not be maintained universally distributed throughout the mortar.

There thus remains a need for a compressible grout mix which can be formulated to provide the optimum compressibility particularly for the specific application where fluid may also be present.

SUMMARY OF THE INVENTION

In one embodiment, the present invention is directed to a method of filling a gap between a subterranean formation and a subterranean structure where the subterranean formation is subject to the possibility of compressive and deformation stresses and possibly fluid seepage after excavation utilizing a compressible grout mix to be placed in the gap between the subterranean formation and the subterranean structure for resilient absorption of forces in the hardened state of the compressible grout mix exerted by the compressive and deformation stresses of the subterranean formation against the subterranean structure, the method comprising:
a. providing a compressible grout mix comprising hydraulic binding agent, bentonite clay, polymer foam particles, water, and one or more additives selected from water-reducing admixture, setting retarding admixture, aggregate materials, anti-wash agents and air,
b. placing the compressible grout mix in the annular gap between the subterranean formation and the subterranean structure, and
c. allowing the compressible grout mix to set, wherein the compressible grout mix in the hardened state has a compressible ratio greater than the anticipated compressive and deformation stresses of the subterranean formation.

In another embodiment, the present invention is directed to a compressible grout mix for filling a gap between a subterranean formation and a subterranean structure where the subterranean formation is subject to the possibility of compressive and deformation stresses and possibly fluid seepage after excavation utilizing a compressible grout mix to be placed in the gap between the subterranean formation and the subterranean structure for resilient absorption of forces in the hardened state of the compressible grout mix exerted by the compressive and deformation stresses of the subterranean formation against the subterranean structure, the compressible grout mix comprising hydraulic binding agent, bentonite clay, polymer foam particles, water, and one or more additives selected from water-reducing admixture, setting retarding admixture, aggregate materials, anti-wash agents and air, wherein the compressible grout mix in the hardened state has a compressible ratio greater than the anticipated compressive and deformation stresses.

In an aspect of the invention, the bentonite clay is sodium bentonite clay.

In another aspect of the invention, the hydraulic binding agent is a Portland cement.

In a further aspect of the invention, the polymer foam particles are expanded polystyrene foam beads.

In yet another aspect of the invention, the water reducing admixture is a polycarboxylate composition.

In another aspect of the invention, the water-reducing and setting retarding admixture is an acidic water-reducing and setting retarding admixture preferably, those containing phosphonic acid.

In another aspect of the invention, the compressible grout mix comprises at least 10% volume Portland cement, between 40% and 60% volume of water, between 30% volume and 45% volume of polymer foam beads, between 5% volume and 15% volume of air, between 1% volume and 3% volume of the bentonite clay, and between 0.1% volume and 1.0% volume of the water reducing admixture and/or the setting retarding admixture.

In yet another aspect of the invention, the compressible grout mix comprises at least 10% volume Portland cement, between 45% volume and 55% volume water, between 35% volume and 40% volume of polymer foam beads, between 7% volume and 12% volume of air, between 1% volume and 3% volume of bentonite clay, and between 0.2% volume and 0.7% volume of the water reducing admixture and/or the setting retarding admixture.

In a further aspect of the invention, the compressible grout mix comprises about 45% volume water, about 35% volume expanded polystyrene beads, about 10% volume Portland cement, about 1.5% volume sodium bentonite clay, about 8% volume air and about 0.2% volume water reducing admixture and/or the setting retarding admixture.

In a further aspect of the invention, the subterranean formation is a tunnel rock formation subject to time dependent deformation and the possibility of fluid seepage after excavation and the subterranean structure is a tunnel liner In another aspect of the invention the subterranean formation is a subterranean formation subject to the possibility of seismic activity and the subterranean structure is a building foundation, a subterranean tunnel, utility service mains or piping.

BRIEF DESCRIPTION OF THE DRAWINGS

A preferred embodiment of the use of the compressible grout mix and method of the present invention is illustrated in the attached drawing in which.

DETAILED DESCRIPTION OF THE PREFERRED EMBODIMENTS

The present invention is directed to a compressible grout mix for filling a gap between a subterranean formation and a subterranean structure where the subterranean formation is subject to the possibility of compressive and deformation stresses and possibly fluid seepage after excavation utilizing a compressible grout mix to be placed in the gap between the subterranean formation and the subterranean structure for resilient absorption of forces in the hardened state of the compressible grout mix exerted by the compressive and deformation stresses of the subterranean formation against the subterranean structure, the compressible grout mix comprising hydraulic binding agent, bentonite clay, polymer foam particles, water, and one or more additional additives selected from water-reducing admixture, setting retarding admixture, aggregate materials, anti-wash agents and air, wherein the compressible grout mix in the hardened state has a compressible ratio greater than the anticipated compressive and deformation stresses. The additional additives are selected such that they do not impact the compressibility of the compressible grout mix as described in detail below.

The subterranean formation subject to the possibility of compressive and deformation stresses and possibly fluid seepage after excavation includes a seismic zone subject to earthquakes. In those situations, the compressive and deformation stresses from an earthquake are transferred through the subterranean formation and can cause cracking and damage to subterranean structures. Another example of a subterranean formation subject to the possibility of compressive and deformation stresses and possibly fluid seepage is time dependent rock formations (swelling rock), where the deformations can be significant and forces from the rock could damage the subterranean structure over a period of time.

The subterranean structure includes foundations of buildings, underground tunnels or utility service mains or piping.

The hydraulic binding agent should include at least one cement or may be a mixture of more than one type of cement and may optionally also include other hydraulic binding agents. Preferably, the hydraulic binding agent is a single cement, more preferably a Portland cement, and most preferably a GU Portland cement.

The bentonite clay in the compressible grout mix is utilized to create micro voids in the hardened compressible grout mix owing to the ability of the bentonite clay to swell when in a wet state and shrink as the compressible grout mix is cured. Preferably the bentonite clay is a sodium bentonite clay utilized in a powder form with a particle size of 200 mess or less.

The polymer foam particles may be shredded polymer foam particles or may be formed particles such as beads. Preferably, the polymer foam particles are an expanded foam bead such as polystyrene, particularly expanded polystyrene. The polymer foam beads provide for compressible aggregates in the compressible grout mix in the hardened state as they are easily compressed under pressure. Preferably, the polymer foam beads have a particle size of between 8 and 30 mesh, most preferably about 16 mesh.

The water is used to activate the cement and thus lead to the hardening of the compressible grout mix. The water is also used to produce the compressible grout mix, to properly mix the components and to provide the desired flowability to the compressible grout mix for handling and pumping.

The water-reducing admixture and/or the setting retarding admixture may be utilized to reduce the water content in the compressible grout mix and/or to slow the setting rate of the cement while retaining the flowing properties of the compressible grout mix to make them more suitable to work. The water-reducing admixture is at least one water-reducing admixture or may be a mixture of more than one type of water-reducing admixture. Preferably, the water-reducing admixture is one or both of a high rate water reducer such as a sulphonate or polycarboxylate, or a water-reducing and setting retarding admixture such as an acidic water-reducing and setting retarding admixture, preferably those containing phosphonic acid, more preferably one or both of the high rate water reducer such as MASTERGLENIUM™ 7700 and the water-reducing and setting retarding admixture such as MASTERSET™ DELVO both available from BASF Corporation.

The anti-wash agent may be present to avoid the segregation of grout in any fluid which may be present in the tunnel, reduce the floating of the polymer foam particles on the grout surface and help the polymer foam particles to stick to the hydraulic binding agent and avoid the floating of the polymer foam particles on the surface of the grout. Preferably, the anti-wash agent is one or both of alkyl aryl sulfonate and alkyl ammonium salt, more preferably a mixture of both of alkyl aryl sulfonate and alkyl ammonium salt, and most preferably a 1:1 mixture of alkyl aryl sulfonate and alkyl ammonium salt. Examples of the alkyl aryl sulfonate and alkyl ammonium salt are VISCO TOP™ available from Kao Corporation.

Aggregates other than bentonite clay may be added to adjust the compressibility of the compressible grout mix. Such aggregates could include other clays, sand or other particulate material.

The air may be added to the compressible grout mix to aid in the flowability of the mix as well as to provide for voids to aid in the compressibility of the hardened compressible grout mix.

The compressible grout mix is prepared in the usual manner by first combining the hydraulic binding agent, bentonite clay, water and the one or more additional additives to produce a paste. The polymer foam beads are then added and mixed to form the final compressible grout mix which can then be dispensed in the usual manner as described below.

Figure 2:
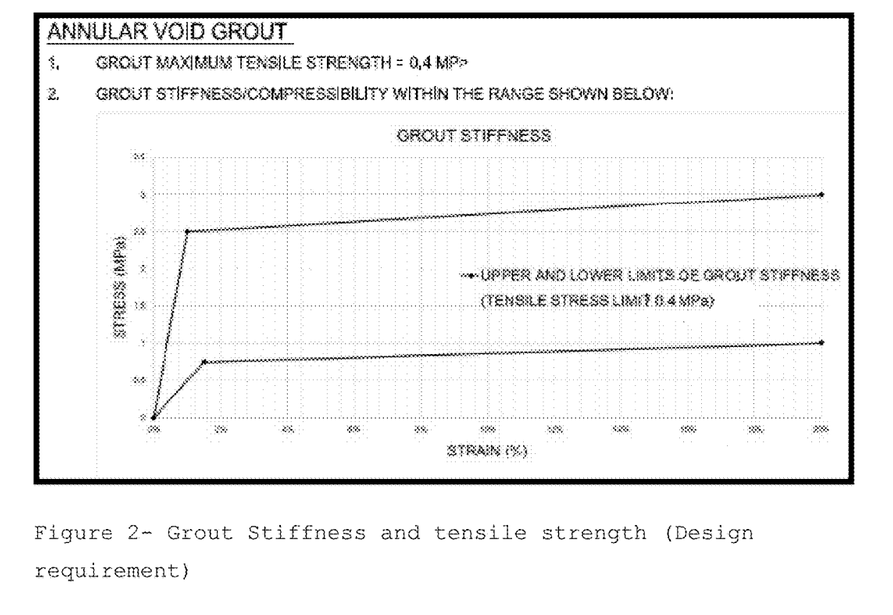
FIG. 2 illustrates the design requirement for a tunnel with time dependent deformation with stiffness between 0.5 MPa to 2.5 MPa.

The proportions of the ingredients are selected based upon the desired compressibility of the compressible grout mix in the hardened state which is in turn based on the expected compressive and deformation stresses of the subterranean formation. The compressible grout mix is formulated to provide a compressible ratio in the hardened state greater than the anticipated compressive and deformation stresses of the subterranean formation. Preferably, the formulation provides a compressible ratio up to twice the anticipated compressive and deformation stresses of the subterranean formation. For example, Georgian Bay Shale has been found to have time dependent horizontal and vertical free swell rates of from 0.05 percent to 0.5 percent and from 0.1 percent to 2.5 percent per log cycle of time respectively. For in situ stresses, the baseline maximum major and minor horizontal stresses are between 6 MPa and 12 MPa and between 2 MPa and 9 MPa, respectively. In these situations, a compressible grout mix capable of supporting up to 20 percent compression as measured by ASTM standard testing protocol ASTM D7012-14 in the hardened state would be able to absorb the time dependent deformation in such rock structure. FIG. 2 illustrates the design characteristics of a compressible grout for such an application.

The proportions of the ingredients are preferably based upon the percent of the total volume of the final compressible grout mix. Thus, the higher the proportion of the polymer foam, bentonite clay as well as the other additives which increase the compressibility of the compressible grout, the more compressible the compressible grout mix will be. However, in order to allow the compressible grout mix to cure and harden, there should be a minimum amount of the hydraulic binding agent in the compressible grout mix. Generally, the compressible grout mix will have the hydraulic binding agent present in a minimum amount of about 10 percent by volume of the total compressible grout mix.

For most compressible grout mixes according to the present invention, the largest proportion ingredient of the compressible grout mix will be water which will generally be present in an amount in proportion to the amount of hydraulic binding agent in the compressible grout mix. For most applications, the water will be present in an amount between about 40 percent and 60 percent of the total volume of the compressible grout mix, preferably in an amount between 45 percent and 55 percent of the total volume of the compressible grout mix.

The proportion of the polymer foam beads is generally the second highest proportion ingredient in the compressible grout mix and has the greatest impact on the compressibility of the hardened compressible grout mix. The proportion of the polymer beads in the compressible grout mix can vary between about 30 percent and 45 percent of the total volume of the compressible grout mix, preferably between about 35 percent and 40 percent of the total volume of the compressible grout mix.

The proportion of any air in the compressible grout mix will also impact the compressibility of the hardened compressible grout mix although to a lesser degree than the polymer foam beads. The proportion of the air in the compressible grout mix can vary between about 5 percent and 15 percent of the total volume of the compressible grout mix, preferably between about 7 percent and 12 percent of the total volume of the compressible grout mix, more preferably between about 7 percent and 10 percent of the total volume of the compressible grout mix.

The proportion of any water-reducing admixture and/or the water-reducing and retarding admixture utilized to reduce the water content in the compressible grout mix and provide flowability and setting benefits will generally vary between about 0.1 percent and 1.0 percent of the total volume of the compressible grout mix, preferably between about 0.2 percent and 0.7 percent of the total volume of the compressible grout mix.

The proportion of any anti-wash agent in the mixture will generally vary between 0.2 and 4.0 percent of the total volume of the compressible grout mix, preferably between about 0.3 and 3.0 percent of the total volume of the compressible grout mix.

The proportion of any other aggregate will generally vary between about 0 percent and 5.0 percent of the total volume of the compressible grout mix, preferably between about 0 percent and 2.0 percent of the total volume of the compressible grout mix.

In a preferred embodiment, the present invention relates to a compressible grout mix for use as an annular fill between a tunnel liner and a tunnel wall of a tunnel bored in a time dependent deformation rock formation particularly where the possibility of fluid seepage is present. In addition, the present invention provides a method of filling an annular gap between a tunnel rock wall surface and a tunnel liner of a tunnel in a rock formation subject to time dependent deformation and the possibility of fluid seepage after excavation. The compressible grout mix is placed in the annular gap between the tunnel rock wall surface and the tunnel liner for resilient absorption of forces in the hardened state of the compressible grout mix exerted by the time dependent deformation of the rock wall surface into the tunnel opening.

Figure 1:
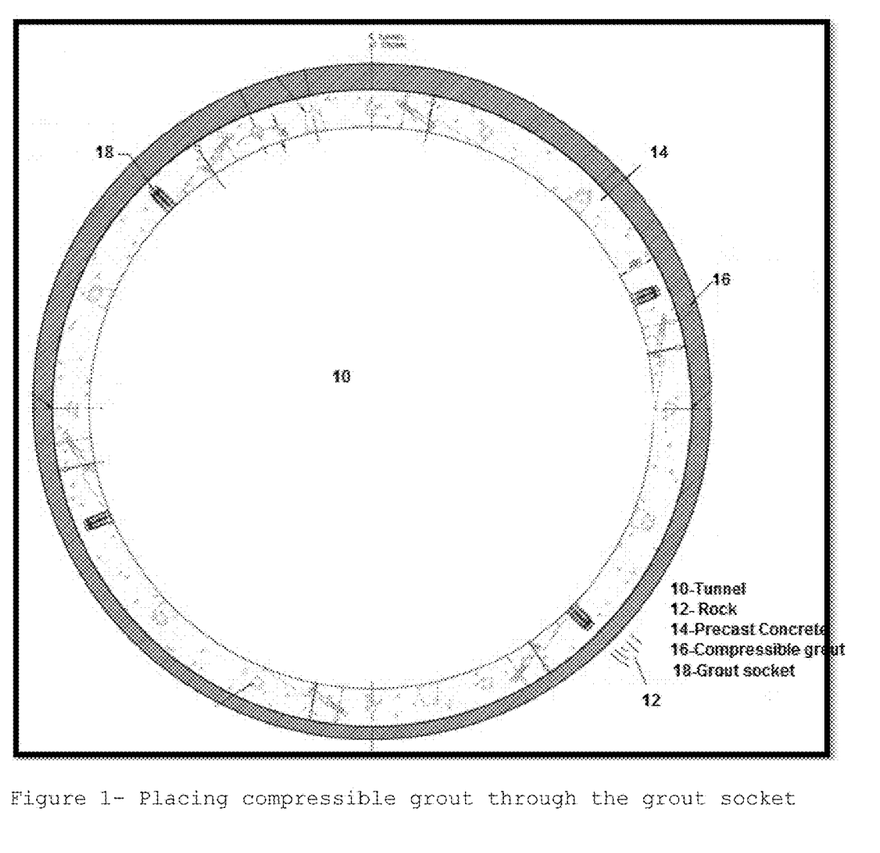
FIG. 1 is a cross section of a tunnel constructed in accordance with the present invention using pre-cast concrete segments.

The utilization of the compressible grout mix of the present invention as an annular fill between a tunnel liner and a tunnel wall of a tunnel bored in a time dependent deformation rock formation is illustrated in FIG. 1. The tunnel 10 is bored through the subterranean rock 12 utilizing a tunnel boring machine (TBM) (not shown). The bored tunnel diameter is larger than the diameter of the liner 14 which can be steel reinforced concrete, fiber reinforced concrete, steel or other material in pre-cast segments. Preferably, the segmented liner 14 is steel reinforced concrete or fiber reinforced concrete. As the tunnel 10 is being bored, the segmented liner 14 is installed to the rear of the TBM and an annular gap 16 is provided between the segmented liner 14 and the tunnel wall surface 18. Generally, the annular gap 16 will have a depth of 50 mm or more between the segmented liner 14 and tunnel wall surface 18. The annular gap 16 is filled with the compressible grout mix 20 of the present invention in typical fashion either by manually pumping through grout holes 22 provided in the liner as illustrated in FIG. 1 or in an automated pumping operation at the rear of the TBM. Once the compressible grout mix cures and hardens, it is capable of resiliently absorbing the forces exerted by the time dependent deformation of the tunnel wall surface into the tunnel opening.

The preparation and properties of preferred embodiments of a compressible grout mix of the present invention will now be described in the following examples which are for purposes of illustration only and are not to be construed as limiting the invention as described above.

Example 1—Preparation of Compressible Grout Mix 360 kg of GU Portland cement were mixed with 40 kg of sodium bentonite powder with a mesh size of 200 and less. 400 liters of water was added to the dry mix to achieve a paste while introducing air to result in an air volume in the final mixed compressible grout of 8.3 percent. To the paste, 2.5 liters of MASTERGLENIUM 7700, 16 kg of ELEMIX EPS beads with an average particle size of 16 mesh were added along with 88 liters of water and mixed thoroughly. This resulted in 1.09 m³ of compressible grout mix having a weight of 906 kg. The compressible grout mix contained 44.8 volume percent water, 35 volume percent ELEMIX beads, 10.4 volume percent GU Portland cement, 1.4 volume percent Sodium bentonite, 8.2 volume percent air and 0.2 volume percent MASTERGLENIUM 7700.

Example 2—Preparation of Another Embodiment the Compressible Grout Mixture 360 kg of GU Portland cement were mixed with 37 kg of sodium bentonite powder with a mesh size of 200 and less. 400 liters of water was added to the dry mix to achieve a paste while introducing air to result in an air volume in the final mixed compressible grout of 8.3 percent. To the paste, 1.5 kg of MASTERSET™ DELVO, 16 kg of ELEMIX EPS beads with an average particle size of 16 mesh were added along with 80 liters of water and mixed thoroughly. This resulted in 1.0 m³ of compressible grout mix having a weight of 906 kg. The compressible grout mix contained 44.8 volume percent water, 35 volume percent ELEMIX beads, 10.4 volume percent GU Portland cement, 1.4 volume percent Sodium bentonite, 8.2 volume percent air and 0.2 volume percent MASTERSET™ DELVO.

Example 3—Preparation of Another Embodiment the Compressible Grout Mixture 360 kg of GU Portland cement were mixed with 37 kg of sodium bentonite powder with a mesh size of 200 and less. 400 liters of water was added to the dry mix to achieve a paste while introducing air to result in an air volume in the final mixed compressible grout of 8.3 percent. To the paste, 0.5 liters of MASTERGLENIUM 7700, 1.0 kg of MASTERSET™ DELVO, 16 kg of ELEMIX EPS beads with an average particle size of 16 mesh were added along with 80 liters of water and mixed thoroughly. This resulted in 1.0 m³ of compressible grout mix having a weight of 906 kg. The compressible grout mix contained 44.8 volume percent water, 35 volume percent ELEMIX beads, 10.4 volume percent GU Portland cement, 1.4 volume percent Sodium bentonite, 8.2 volume percent air, 0.1 volume percent MASTERGLENIUM 7700, and 0.1 volume percent MASTERSET™ DELVO.

Example 4—Preparation of Another Embodiment of the Compressible Grout Mixture 315 kg of GU Portland cement were mixed with 45 kg of sodium bentonite powder with a mesh size of 200 and less. 600 liters of water was added to the dry mix to achieve a paste. To the paste, 16 kg of ELEMIX EPS beads with an average particle size of 16 mesh were added and mixed thoroughly

Example 5—Compression Testing of Samples of the Compressible Grout Mix

Figure 3:
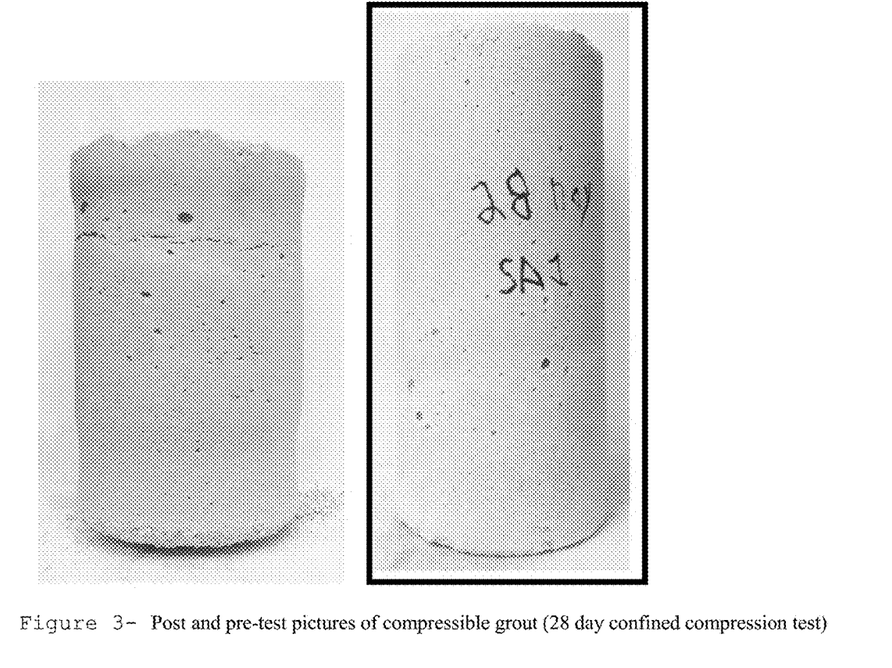
FIG. 3 is a picture of the pre-test and post-test specimens of a confined compression test of a compressible grout of the present invention.
Figure 4:
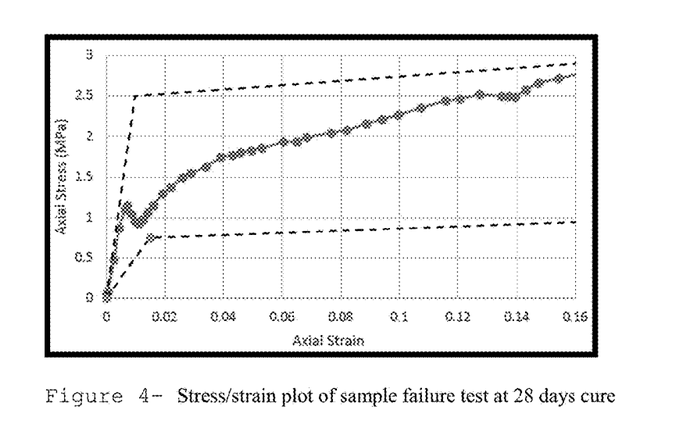
FIG. 4 is a stress/strain plot of a confined 28 day cure specimen.

Six concrete core specimens were prepared utilizing the compressible grout mix prepared in accordance with Example 1 above. Each of the samples had a length of approximately 20 cm and a diameter of approximately 10 cm. Two samples at a 7 day cure interval were tested using standard ASTM testing protocol (ASTM D7012-14) for unconfined compression strength analysis. Subsequently a nonstandard European test for semi-confined compression strength testing was conducted utilizing 14 and 28 day cure specimens. One specimen was tested at 14 days cure and 2 additional specimens were tested at 28 day cure for modified compressive strengths. For all of the above testing, each sample was cut to prepare cylindrical samples having nearly parallel end faces. The testing was conducted to failure within a servo controlled compression frame. All tests were performed under axial strain control at rates approximating $2 \times 10^{-4}$ s$^{-1}$ (equivalent to an axial deformation rate of 0.033 mm/s) and for these tests, simultaneous recording of axial force and axial deformation was performed from which determination of standard failure parameters (Young's modulus and peak compressive strength) were made and each unconfined compression test was permitted to undergo axial deformation equivalent to 20% axial strain prior to completion of testing. The result of a confined compression test of a 28 day cure specimen of compressible grout of the present invention is illustrated in FIG. 3 which shows the pre-test and post-test specimen. FIG. 4 illustrates the strain/stress plot of a 28 day cure specimen conducted as described above.

One 28 day cure specimen was sectioned into wafer specimens exhibiting axial lengths approximately 0.4 times the sample diameter in order to complete tensile strength testing using the Brazilian indirect tensile strength test (ASTM D3967-08). From the one 28 day cure sample 4 test specimens were obtained and the Brazilian tensile strength values were obtained for each specimen and averaged. The results of all of the above testing are illustrated in the following Table 1.

TABLE 1

Sample Compression Strength Failure Test Results

| Sample (Cure Age, days) | Density (g/cm3) | Young's Modulus (MPa) | UCS (MPa) | Brazilian Tensile Strength (values) average (MPa) |
|---|---|---|---|---|
| SA1 (7 days)-unconfined | 0.87 | 185.9 | 0.82 | — |
| SA2 (7 days)-unconfined | 0.78 | 108.6 | 0.72 | — |
| SA3 (14 days)-confined | 0.86 | 103.4 | 2.06 | — |
| SA4 (SA1-28 days)-confined | 0.85 | 158.4 | 3.70 | — |
| SA5 (SA2-28 days)-confined | 0.83 | 202.6 | 3.62 | — |
| SA6 (28 days)-tensile | — | — | — | (0.29, 0.24, 0.27, 0.24) 0.26 |

The test results illustrated in FIGS. 3 and 4 and set out in Table 1 demonstrate that the compressible grout mix prepared in accordance with Example 1 is able to handle the time dependent deformation expected when utilized as an annular gap fill between a tunnel liner and the tunnel wall surface of a tunnel bored in Georgian Bay shale as described above.

Example 6—Compression Testing of Samples of the Compressible Grout Mix

Concrete core specimens were prepared utilizing the compressible grout mix prepared in accordance with Example 4 above. Each of the samples had a length of approximately 20 cm and a diameter of approximately 10 cm. Samples were tested using standard ASTM testing protocol (ASTM D7012-14) for unconfined compression strength analysis. For all of the above testing, each sample was cut to prepare cylindrical samples having nearly parallel end faces. The testing was conducted to failure within a servo controlled compression frame. All tests were performed under axial strain control at rates approximating $2\times10^{-4}$ s$^{-1}$ (equivalent to an axial deformation rate of 0.033 mm/s) and for these tests, simultaneous recording of axial force and axial deformation was performed from which determination of standard failure parameters (Young's modulus and peak compressive strength) were made and each unconfined compression test was permitted to undergo axial deformation equivalent to 20% axial strain prior to completion of testing. The results of all of the above testing are illustrated in the following Table 2.

TABLE 2

Sample Unconfined Compression Strength Failure Test Results

| Sample and (Cure Age) | Density (g/cm$^3$) | Initial Young's Modulus at <1-2% axial strain (MPa) | UCS @ Initial Unconfined Loading State (MPa) | Young's Modulus at 10% axial strain (MPa) | Compression Resistance at 20% Axial Strain (MPa) |
|---|---|---|---|---|---|
| Lift 1 (3 days) | 1.01 | 88.8 | 0.30 | 5.3 | 1.34 |
| Lift 2 (3 days) | 1.00 | 116.6 | 0.35 | 5.7 | 1.47 |
| Lift 3 (3 days) | 1.00 | 103.3 | 0.35 | 5.5 | 1.44 |
| Lift 1 (7 days) | 0.99 | 82.3 | 0.61 | 6.7 | 1.81 |
| Lift 2 (7 days) | 1.02 | 87.9 | 0.68 | 7.3 | 2.04 |
| Lift 3 (7 days) | 1.00 | 101.5 | 0.55 | 6.8 | 1.93 |
| Lift 1 (28 days) | 1.02 | 100.7 | 0.86 | 9.38 | 2.51 |
| Lift 2 (28 days) | 1.01 | 108.5 | 0.86 | 9.99 | 2.60 |
| Lift 3 (28 days) | 1.01 | 101.0 | 0.94 | 10.78 | 2.55 |

The test results illustrated in FIGS. 3 and 4 and set out in Tables 1 and 2 demonstrate that the compressible grout mix prepared in accordance with the present invention is able to handle the time dependent deformation expected when utilized as an annular gap fill between a tunnel liner and the tunnel wall surface of a tunnel bored in Georgian Bay shale as described above.

The compressible grout mix of the present invention provides a stable backfill for the concrete segments accommodating the deformation of the annular space. The compressible grout mix helps to minimize settlement of the tunnel liner while holding the segments of the tunnel liner in place during the tunnel boring operation. The compressible grout mix ensures that there is uniform contact between the tunnel liner and the tunnel wall surface. The compressible grout mix also reduces the surface settlement over the tunnel. If the void is not filled with compressible grout mix, the ground will move into the void resulting in settlement. The compressible grout mix also acts as a backup to the gasket minimizing water leakage and penetration of gases into the tunnel thus aiding in reducing seepage and loss of fine particles and water where the gaskets provided between the tunnel segments become ineffective or damaged.

The compressible grout mix of the present invention is engineered for the specific application based upon the characteristics of the rock formation through which the tunnel is being bored. In the specific example provided above, the compressible grout mix has been formulated to accommodate the expected time dependent deformation found in Georgian Bay shale common in southern Ontario. However, utilizing the teaching of the present application, the formulation of the compressible grout mix of the present invention may be easily modified to accommodate rock formations having different time dependent deformation characteristics simply by adjusting the proportions of the compressible materials in the compressible grout mix, namely the expanded foam beads, bentonite clay, and air.

The specific examples set out above relate to the use of the compressible grout mix for use in filling an annular gap between a tunnel rock wall surface and a segmented concrete tunnel liner. The compressible grout mix is also useful in other applications where an annular gap between a tunnel wall and tunnel liner has to be filled. For example, in situations where a temporary steel liner is installed prior to a final liner of cast in place concrete, the compressible grout may be used in the annular gap between the tunnel wall and tunnel liner. The compressible gout of the present invention is also useful for filling gaps between other precast structures and time dependent deformation rock formations. Other uses of the compressible grout of the present invention will be apparent to those of skill in the art.

While preferred embodiments of the present invention have been illustrated in the present application, it will be appreciated by those of skill in the art that variations may be made thereto without departing from the scope of the invention as expressed in the appended claims.

The invention claimed is:

1. A method of filling an annular gap between a tunnel rock wall surface and a tunnel liner of a tunnel in a rock formation subject to time dependent deformation after excavation utilizing a compressible grout mix to be placed in the annular gap between the tunnel rock wall surface and the tunnel liner for resilient absorption of forces in the hardened state of the compressible grout mix exerted by the time dependent deformation of the rock wall surface into the tunnel opening, the method comprising:
   a. providing a compressible grout mix comprising hydraulic binding agent, bentonite clay, polymer foam particles, water-reducing admixture and/or setting retarding admixture, water and air;
   b. placing the compressible grout mix in the annular gap between the tunnel wall rock surface and the tunnel liner; and
   c. allowing the compressible grout mix to set, wherein the compressible grout mix in the hardened state has a compressible ratio greater than the anticipated time dependent deformation.

2. The method of filling the annular gap between the tunnel rock wall surface and the tunnel liner as claimed in claim 1 wherein the bentonite clay is a sodium bentonite clay.

3. The method of filling the annular gap between the tunnel rock wall surface and the tunnel liner as claimed in claim 2 wherein the hydraulic binding agent is a Portland cement.

4. The method of filling the annular gap between the tunnel rock wall surface and the tunnel liner as claimed in claim 3 wherein the water reducing admixture is a polycarboxylate composition.

5. The method of filling the annular gap between the tunnel rock wall surface and the tunnel liner as claimed in claim 4 wherein the polymer foam particles are a polymer foam beads.

6. The method of filling the annular gap between the tunnel rock wall surface and the tunnel liner as claimed in claim 5 wherein the polymer foam beads are an expanded polystyrene foam beads.

7. The method of filling the annular gap between the tunnel rock wall surface and the tunnel liner as claimed in claim 6 wherein the compressible grout mix comprises at least 10% volume Portland cement, between 40% volume and 60% volume of water, between 30% volume and 45% volume of polymer foam beads, between 5% volume and 15% volume of air, between 1% volume and 3% volume of the bentonite clay, and between 0.1% volume and 1.0% volume of the water reducing admixture and/or the setting retarding admixture.

8. The method of filling the annular gap between the tunnel rock wall surface and the tunnel liner as claimed in claim 7 wherein the compressible grout mix comprises at least 10% volume Portland cement, between 45% volume and 55% volume water, between 35% volume and 40% volume of polymer foam beads, between 7% volume and 12% volume of air, between 1% volume and 3% volume of bentonite clay, and between 0.2% volume and 0.7% volume of the water reducing admixture and/or the setting retarding admixture.

9. The method of filling the annular gap between the tunnel rock wall surface and the tunnel liner as claimed in claim 8 wherein the compressible grout mix comprises about 45% volume water, about 35% volume expanded polystyrene beads, about 10% volume Portland cement, about 1.5 volume percent sodium bentonite clay, about 8% volume air and about 0.2% volume water reducing admixture and/or the setting retarding admixture.

* * * * *